(12) United States Patent
Yoneda (10) Patent No.: US 8,274,696 B2
(45) Date of Patent: Sep. 25, 2012

(54) COLOR TABLE EDITING APPARATUS, COLOR TABLE EDITING METHOD, PROGRAM, AND STORAGE MEDIUM

(75) Inventor: Naoto Yoneda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 802 days.

(21) Appl. No.: 11/676,718

(22) Filed: Feb. 20, 2007

(65) Prior Publication Data

US 2007/0195343 A1 Aug. 23, 2007

(30) Foreign Application Priority Data

Feb. 22, 2006 (JP) ................................. 2006-045862

(51) Int. Cl.
*H04N 1/60* (2006.01)
(52) U.S. Cl. .......... 358/1.9; 345/619; 358/518; 358/520
(58) Field of Classification Search ........... 358/1.9–1.18
See application file for complete search history.

(56) References Cited

U.S. PATENT DOCUMENTS

| 2001/0040983 A1* | 11/2001 | Nishikawa | 382/109 |
| 2002/0159081 A1* | 10/2002 | Zeng | 358/1.9 |
| 2003/0001860 A1* | 1/2003 | Yamazaki et al. | 345/590 |
| 2003/0053689 A1* | 3/2003 | Watanabe et al. | 382/167 |
| 2004/0257597 A1* | 12/2004 | Fujio et al. | 358/1.9 |
| 2005/0024653 A1* | 2/2005 | Seo | 358/1.9 |
| 2005/0195415 A1* | 9/2005 | De Baer | 358/1.9 |
| 2006/0098025 A1* | 5/2006 | Jang et al. | 345/594 |
| 2007/0195343 A1* | 8/2007 | Yoneda | 358/1.9 |

FOREIGN PATENT DOCUMENTS

JP 10-133638 5/1998

* cited by examiner

*Primary Examiner* — Benny Q Tieu
*Assistant Examiner* — Marcellus Augustin
(74) *Attorney, Agent, or Firm* — Fitzpatrick, Cella, Harper & Scinto (57) ABSTRACT

A color table editing apparatus includes an image data input unit configured to input image data, a color table selection unit configured to select a given color table from a plurality of color tables in association with the input image data, an initial color data generation unit configured to generate initial color data from the selected color table and representative color data including a plurality of predetermined colors, a target color data editing unit configured to edit the initial color data to generate target color data, an optimized color data generation unit configured to generate optimized color data by performing optimization processing based on a color gamut of the edited target color data, and a user interface image display unit configured to display on a 2-dimensional color plane a user interface image including the target color data and optimized color data.

18 Claims, 7 Drawing Sheets

COLOR TABLE EDITING APPARATUS, COLOR TABLE EDITING METHOD, PROGRAM, AND STORAGE MEDIUM

BACKGROUND OF THE INVENTION

1. Field of the Invention

The present invention provides a color table editing apparatus, color table editing method, program, and storage medium for editing a color table used particularly when performing color processing in data processing of image data obtained by a digital camera or scanner.

2. Description of the Related Art

Conventionally, there have been proposed a number of image data processing apparatuses which perform correction of hue, color saturation, brightness, and the like of a whole image for image data obtained by an image input apparatus such as a digital camera or scanner. There has also been proposed an image data processing apparatus which uses a complicated user interface to generate a color table for adjusting the hue and color saturation of only one specific color and to correct the color of obtained image data by using the generated color table.

SUMMARY OF THE INVENTION

A conventional image data processing apparatus such as one disclosed in Japanese Patent Laid-Open No. 10-133638 requires preparation of a plurality of input data, or the user interface of the conventional apparatus is not user-friendly. The only apparatus available to perform color correction for reproducing a desired color is very difficult for beginners to use.

The present invention has been made in consideration of the above problems, and has as its object to provide a color table editing apparatus which allows even a beginner to reproduce a color corresponding to the user's preference via a simple user interface.

In order to solve the above problems, a color table editing apparatus according to an embodiment of the present invention comprises:

an image data input unit configured to input image data;

a color table selection unit configured to select a specific color table from a plurality of color tables in association with the input image data;

an initial color data generation unit configured to generate initial color data from the selected specific color table and representative color data including a plurality of predetermined colors;

a target color data editing unit configured to edit the initial color data to generate target color data;

an optimized color data generation unit configured to generate optimized color data by performing optimization processing based on a color gamut of the edited target color data; and a user interface image display unit configured to display on a 2-dimensional color plane a user interface image including the target color data and the optimized color data.

In order to solve the above problems, a color table editing method according to another embodiment of the present invention comprises:

an image data input step adapted to input image data;

a color table selection step adapted to select a specific color table from a plurality of color tables in association with the input image data;

an initial color data generation step adapted to generate initial color data from the selected specific color table and representative color data including a plurality of predetermined colors;

a target color data editing step adapted to edit the initial color data to generate target color data;

an optimized color data generation step adapted to generate optimized color data by performing optimization processing based on a color gamut of the edited target color data; and a user interface image display step adapted to display on a 2-dimensional color plane a user interface image including the target color data and the optimized color data.

According to the present invention, a color table can be generated which allows even a beginner to easily reproduce a preferable color from image data via a simple user interface.

Further features of the present invention will become apparent from the following description of exemplary embodiments with reference to the attached drawings.

DESCRIPTION OF THE EMBODIMENTS

Preferred embodiments of the present invention will be described below with reference to the drawings.

<First Embodiment>

Figure 1:
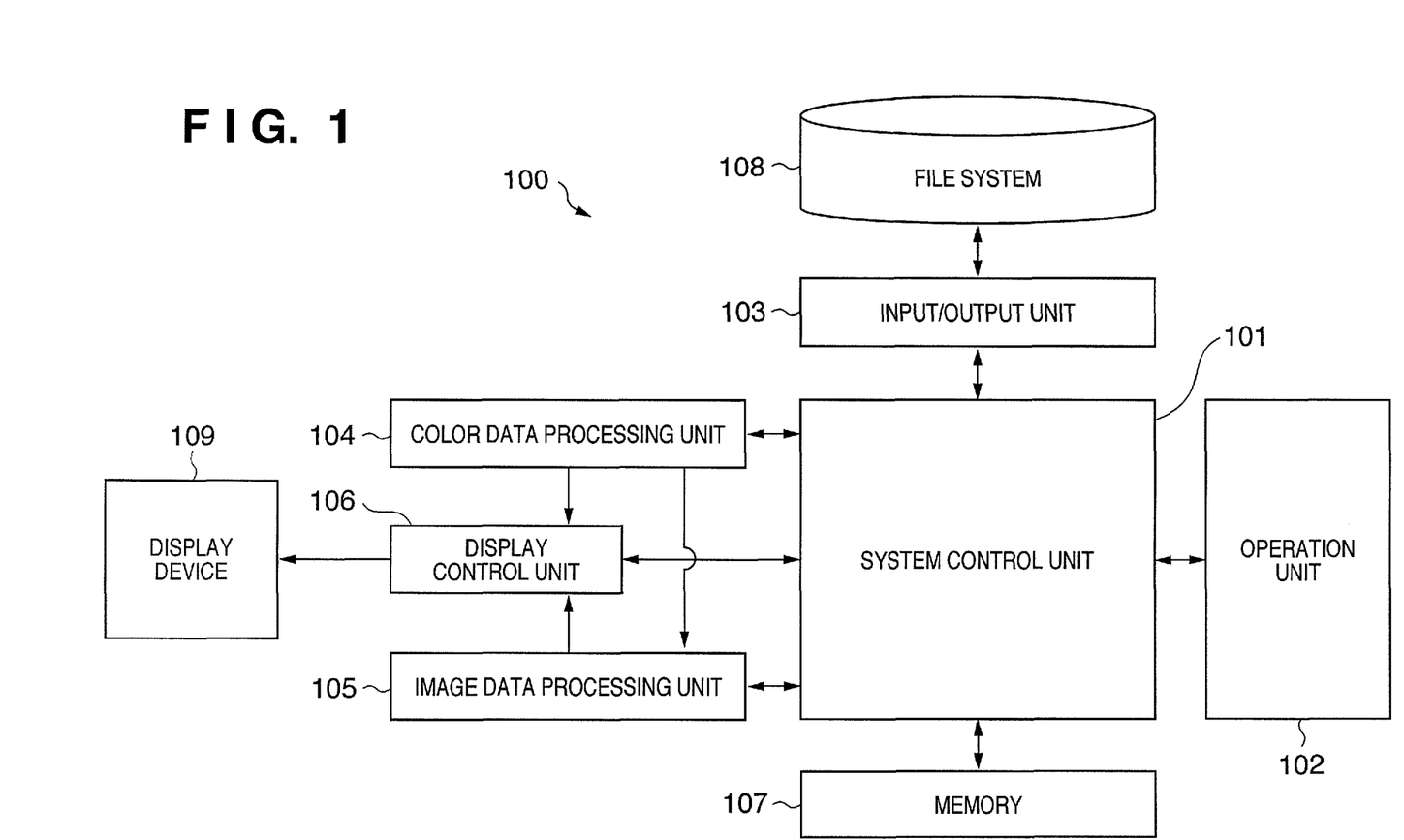
FIG. 1 is a functional block diagram showing the main structure of a color table editing apparatus according to an embodiment of the present invention.

FIG. 1 is a functional block diagram showing the main structure of a color table editing apparatus 100 according to an embodiment of the present invention.

With reference to FIG. 1, a system control unit 101 of the color table editing apparatus 100 communicates with the other units to be described below and controls the overall system of the color table editing apparatus 100. An operation unit 102 including an input device such as a mouse and keyboard receives input data through user operation and notifies the system control unit 101 of the received input data. A file system 108 is a storage unit for storing an image file including image data and associated data about the image file and the like, and includes a mass storage device such as a hard disk.

An input/output unit 103 receives image data and associated data from the file system 108 and notifies the system control unit 101 of the received data. The input/output unit 103 outputs a generated custom color table to the file system 108. A color data processing unit 104 generates initial color data of a target color and optimized color data and sends the respective data to a display control unit 106, thereby supplying those data to the display control unit 106. The display control unit 106 generates a user interface image, supplies it to a display device 109, and displays the initial color data of the target color and optimized color data in the user interface image. The color data processing unit 104 generates a custom color table of a user and notifies an image data processing unit 105 of the generated table to apply it to image data. The color data processing unit 104 notifies the system control unit 101 of a request to store a file in the file system 108.

The image data processing unit 105 generates before-edit image data and after-edit image data from image data in the file system 108 input from the input/output unit 103, a user-selected color table from a memory 107, and a custom color table obtained from the color data processing unit 104. The image data processing unit 105 supplies the before-edit image data and after-edit image data generated as described above to the display control unit 106 to generate a user interface image. The display device 109 displays the user interface image.

The display control unit 106 generates a user interface image which displays the initial data of a target color obtained from the color data processing unit 104, optimized color data, and before-edit image data and after-edit image data obtained from the image data processing unit 105. The memory 107 is a unit for holding image data input from the input/output unit 103 and storing representative color data, user-selectable color tables, and the like. The file system 108 holds an image file or image data via the input/output unit 103, or associated data such as the custom color table generated in the color data processing unit 104.

Figure 2:
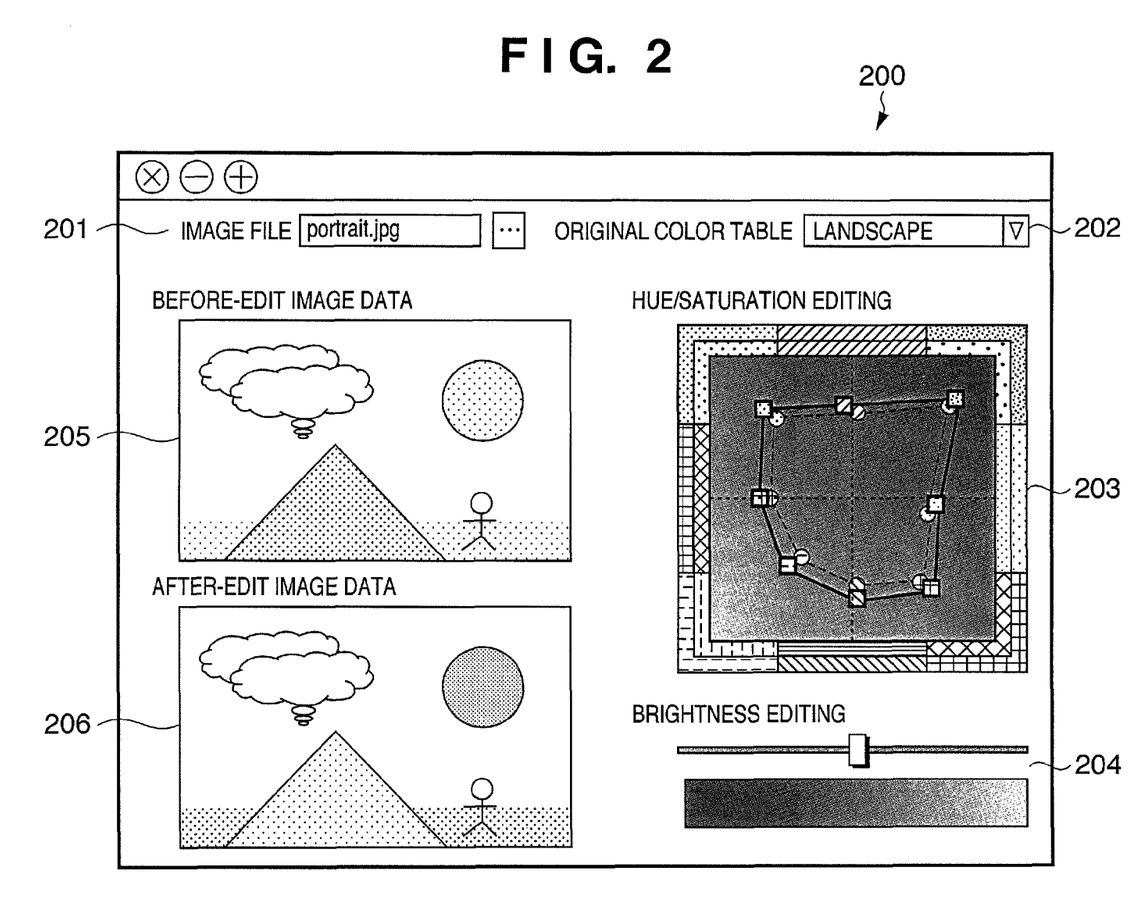
FIG. 2 shows the main arrangement of a user interface image according to the embodiment of the present invention.

FIG. 2 is a view showing the main arrangement of a user interface image 200 generated by the display control unit 106 shown in FIG. 1 and displayed in the display device 109.

In the user interface image 200 shown in FIG. 2, an image file selection operating section 201 comprises a display part for selecting and reading, through user operation of the operation unit 102, a given image file stored in the file system 108. A color table selection operating section 202 comprises a display part for selecting, through user operation of the operation unit 102, an original color table from which a custom color table is to be generated.

A hue/saturation edit operating section 203 comprises a display part which displays data about the hue and color saturation of the initial color data of a target color, those of target color data edited by a user, and those of optimized color data. The hue/saturation edit operating section 203 comprises a display part for controlling the target color data such that the user can edit it by an operation, e.g., a dragging operation of the mouse and the like provided to the operation unit 102. A brightness edit operating section 204 displays data about the brightness of the initial data of the target color, the target color data operated by the user, and the optimized color data. The brightness edit operating section 204 comprises a display part for controlling the target color data such that the user can edit it by an operation, e.g., a dragging operation of the mouse and the like provided to the operation unit 102.

A before-edit image data display section 205 comprises a display part for displaying the image data obtained by applying the original color table selected in the color table selection operating section 202 by user operation of the operation unit 102 to the image data selected in the image file selection operating section 201.

An after-edit image data display section 206 displays image data obtained by reflecting the result of a user's edit-operation in the hue/saturation edit operating section 203 and brightness edit operating section 204 to the original color table selected in the color table selection operating section 202 by the user's operation of the operation unit 102. That is, the after-edit image data display section 206 comprises a display part which displays the resultant image data obtained by applying the generated custom color table to the image data selected in the image file selection operating section 201.

Figure 3:
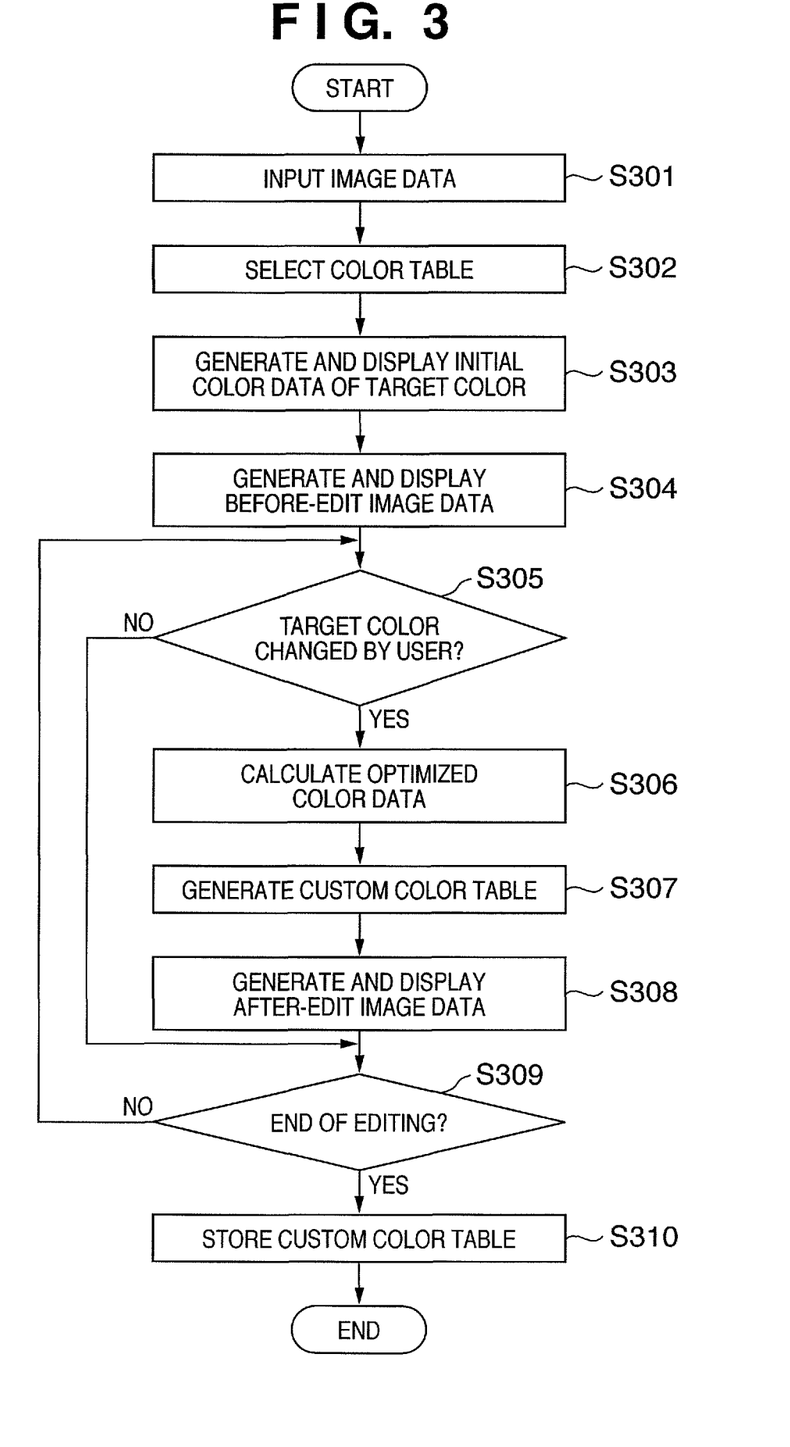
FIG. 3 is a flowchart for explaining the operation procedure for generating a custom color table by a user in the color table editing apparatus according to the embodiment of the present invention.

FIG. 3 is a flowchart for explaining the operation of the color table editing apparatus 100 according to the embodiment of the present invention, and shows the procedure for generating a custom color table through user operation of the operation unit 102.

In step S301, a user operates the operation unit 102 and inputs the image data selected in the image file selection operating section 201 from the file system 108. In step S302, the user operates the operation unit 102 and inputs the original color table selected in the color table selection operating section 202. In step S303, the input original color table and representative color data obtained from the memory 107 are input to the color data processing unit 104 to generate the initial color data of a target color by gamut mapping or the like, and the initial color data of the target color is displayed in the hue/saturation edit operating section 203. At this time, the image data and color table are stored in the memory 107. In step S304, the input image data and selected original color table are transmitted to the image data processing unit 105 and displayed as before-edit image data in the before-edit image data display section 205.

In step S305, the color table editing apparatus 100 receives a mouse operation or keyboard operation from the user from the operation unit 102, and determines that the user operated the target color when the operation is for the hue/saturation edit operating section 203 or brightness edit operating section 204. In this case, processings to be described below are sequentially performed. When an operation other than the above-described one or no operation is given, no specific processing is performed.

When it is determined in step S305 that the user operated the target color by using the operation unit 102, the process advances to step S306. The color table editing apparatus 100 obtains target color data operated by the user from the hue/saturation edit operating section 203 and brightness edit operating section 204 and notifies the color data processing unit 104 of the obtained target color data. The color data processing unit 104 obtains the representative color data and the original color table selected by the user from the memory 107. The representative color data and original color table are optimized to the above-described target color data, and optimized color data is generated. This is calculation processing for making all color data including the target color data operated by the user and color data not operated by the user fall within a color gamut. For all operational target colors, optimized color data are generated by using a least mean square approximation so as to minimize the difference between the calculated result and the target color data operated by the user.

In a following step S307, the color data processing unit 104 generates a custom color table from the generated optimized color data.

The process advances to step S308, and the color data processing unit 104 supplies the generated custom color table to the image data processing unit 105 to generate after-edit image data and to display it in the after-edit image data display section 206 of the display device 109 via the display control unit 106.

The user can easily determine whether a preferable color table has been generated, by executing the operations described above and comparing the after-edit image data generated as the operation result with the before-edit image data, or comparing the initial value of the target color data with the optimized color data. When the user determines that the preferable color table has been generated, the edit operation is ended in step S309. The custom color table generated last is stored as a file in the file system 108, and edit processing is ended. However, when no preferable color table is generated and the user is not satisfied in step S309, the process returns to step S305. In this case, the user can repeat the above-described edit processing until he/she is satisfied.

<Second Embodiment>

The structure of a display part which provides a user interface image 200 will be described. With this user interface image 200, the display method of each display part in the display device 109 by the display control unit 106 and the operation method of the display parts in the first embodiment can be understood more easily.

Figure 4A:
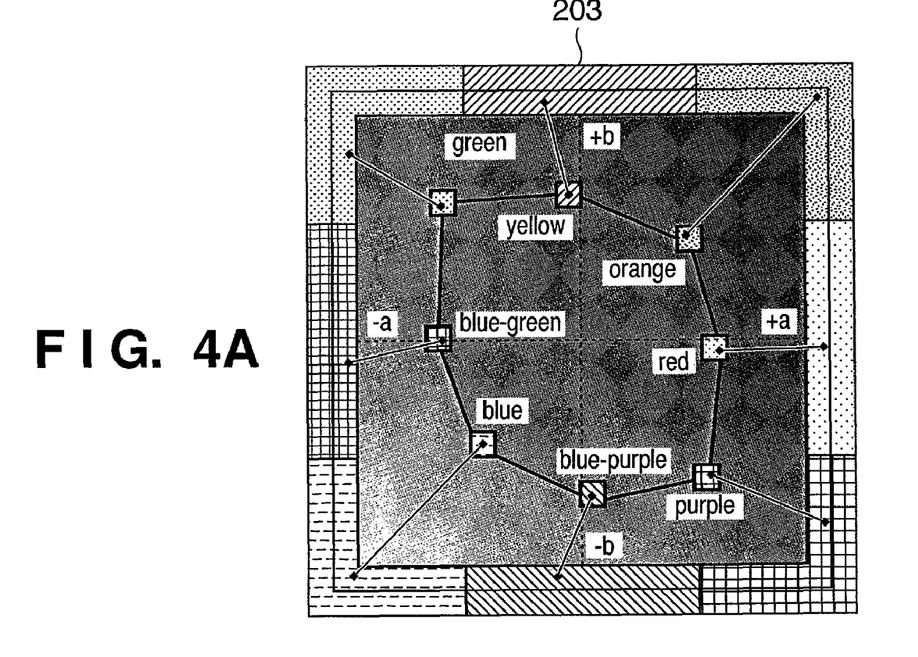
FIGS. 4A and 4B show examples of the user interface image immediately after selecting an original color table in the color table editing apparatus according to the embodiment of the present invention.
Figure 4B:
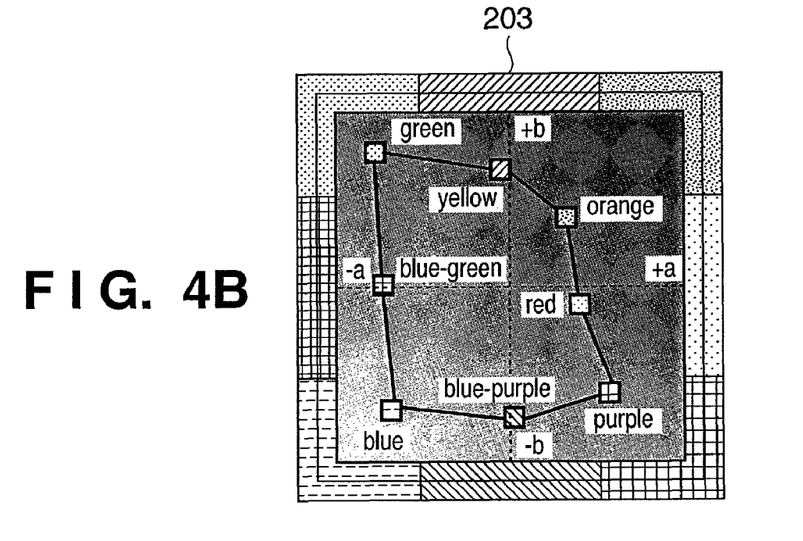

FIGS. 4A and 4B show examples of the user interface image 200 of a display part displayed in a hue/saturation edit operating section 203 immediately after a user selects an original color table in a color table selection operating section 202 by using the operation unit 102.

In this embodiment, representative color data is defined to comprise eight colors of "green", "yellow", "orange", "red", "purple", "blue-purple", "blue", and "blue-green" obtained by dividing a hue circle into eight equal parts. The representative color data and an original color table selected by the user are input to the color data processing unit 104, and the obtained target color data are respectively plotted with squares at the corresponding positions on a color plane in an L*a*b* color space, i.e., an ab plane having an a axis and a b axis in this embodiment. These plots are called "control points". This constitutes a graphic user interface which receives the user's operation to be described later and makes the control points movable.

The control points as the plotted points are displayed while being connected to each other to form an octagon. Along the periphery of the ab plane, a color palette corresponding to the plotted control points is displayed. The color palette is divided into eight parts in correspondence with the plotted control points, and each color palette has a double-frame structure. Note that, since FIG. 4A shows a state before the user operates the target color data, both the inside (ab plane side) and outside of the color palette displayed with a double frame are displayed in the color corresponding to the initial color data of the target color.

The background of the ab plane is displayed in the corresponding color with gradation in order to help the user easily understand the relationship between movement to a specific coordinate point and the resultant change of the corresponding color upon the user's operation of the target color on the ab plane. Note that, although each control point is connected to the corresponding color palette in FIG. 4A, these lines need not always be displayed. For example, such lines are not shown in the drawings from FIG. 4B. However, the connected form helps the user intuitively understand the balance, e.g., the feature and bias of the colors, of the current color table. For example, when the form projects toward "green", the parameter strongly enhances "green".

FIG. 4B shows an example of the user interface image 200 of a display part displayed in the hue/saturation edit operating section 203 immediately after the user selects the original color table by using the operation unit 102, as in FIG. 4A. FIG. 4B shows an example of a case in which the user selects an original color table (in this case, a color table which enhances "green" and "blue") different from one in FIG. 4A. Since the initial values of the target color data are different from those in FIG. 4A, the display positions of the control points change and the overall form of the octagonal formed by connecting the control points change.

Figure 5A:
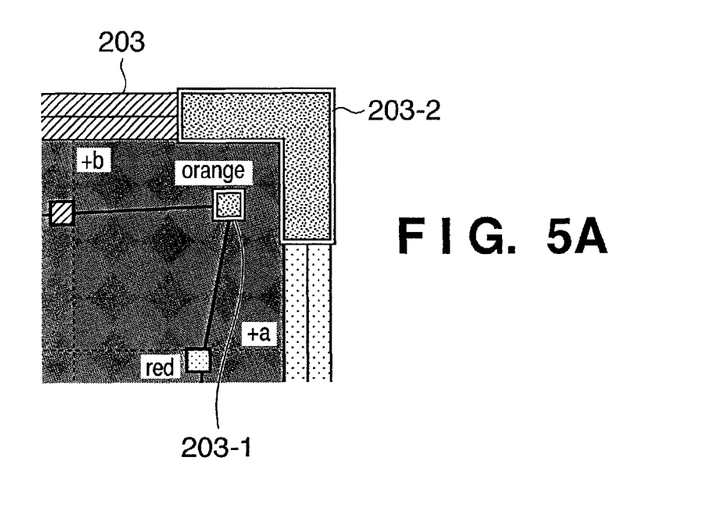
FIGS. 5A and 5B show examples of the user interface image when user's operation is made in the color table editing apparatus according to the embodiment of the present invention.
Figure 5B:
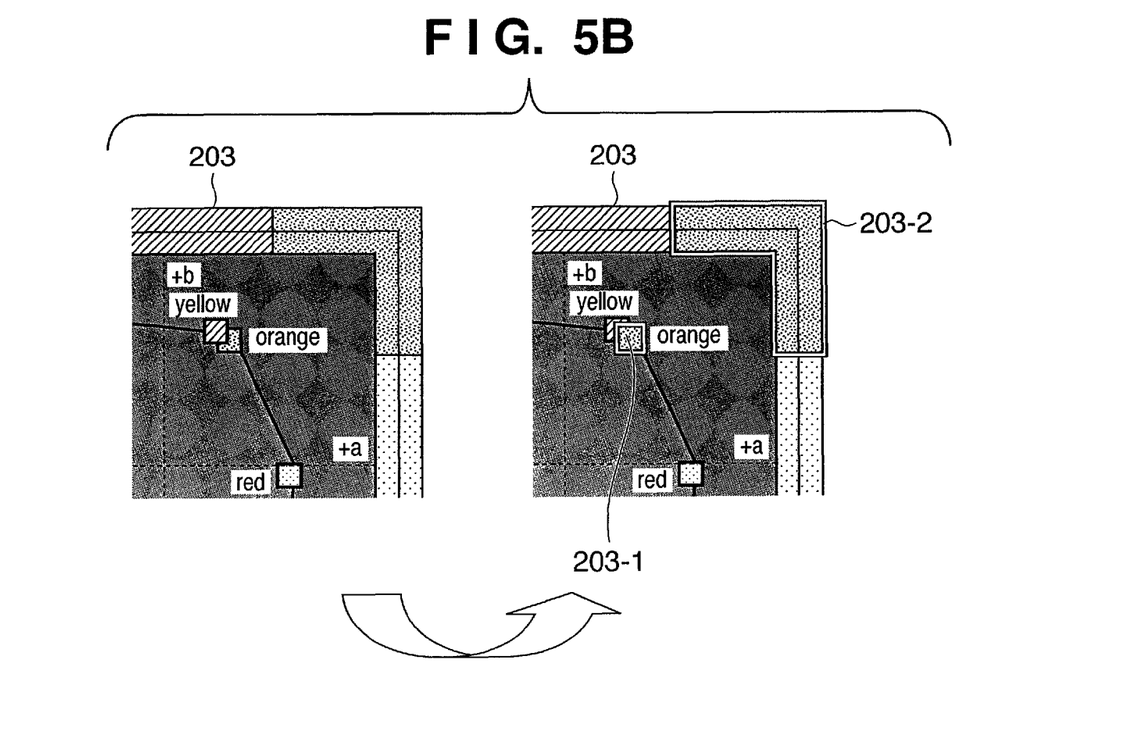

FIGS. 5A and 5B show examples of the user interface image 200 when the user operates the target color in the color table selection operating section 202 or performs a click operation with the mouse on the color palette along the periphery of the ab plane.

As shown in FIG. 5A, when the user clicks the target color control point ("orange" in the case of FIG. 5A) with the mouse and the like, it is set in a focused state and a focus frame 203-1 is displayed. The control point displayed with the focus frame 203-1 is movable on the ab plane. This control point is generally moved by a dragging operation of the mouse in the operation unit 102. At the same time, the color palette corresponding to the control point displayed with the focus frame 203-1 is also set in the focused state and a focus frame 203-2 is displayed.

When a color palette is clicked by the mouse in the operation unit 102, the color palette and the control point of the corresponding target color can be set in the focused state.

FIG. 5B shows an example of the user interface display which makes the following operation when the control points of two target colors are displayed to overlap each other on the ab plane, and the user wants to operate only the lower control point.

In FIG. 5B, if the upper target color control point is operated first in order to operate the lower target color control point, optimization is performed at this timing, and the intended result cannot be acquired.

When the user clicks the color palette corresponding to the lower target color control point with the mouse in the operation unit 102, the lower target color control point is displayed in the foreground. Therefore, the user can easily operate the target color control point.

Figure 6:
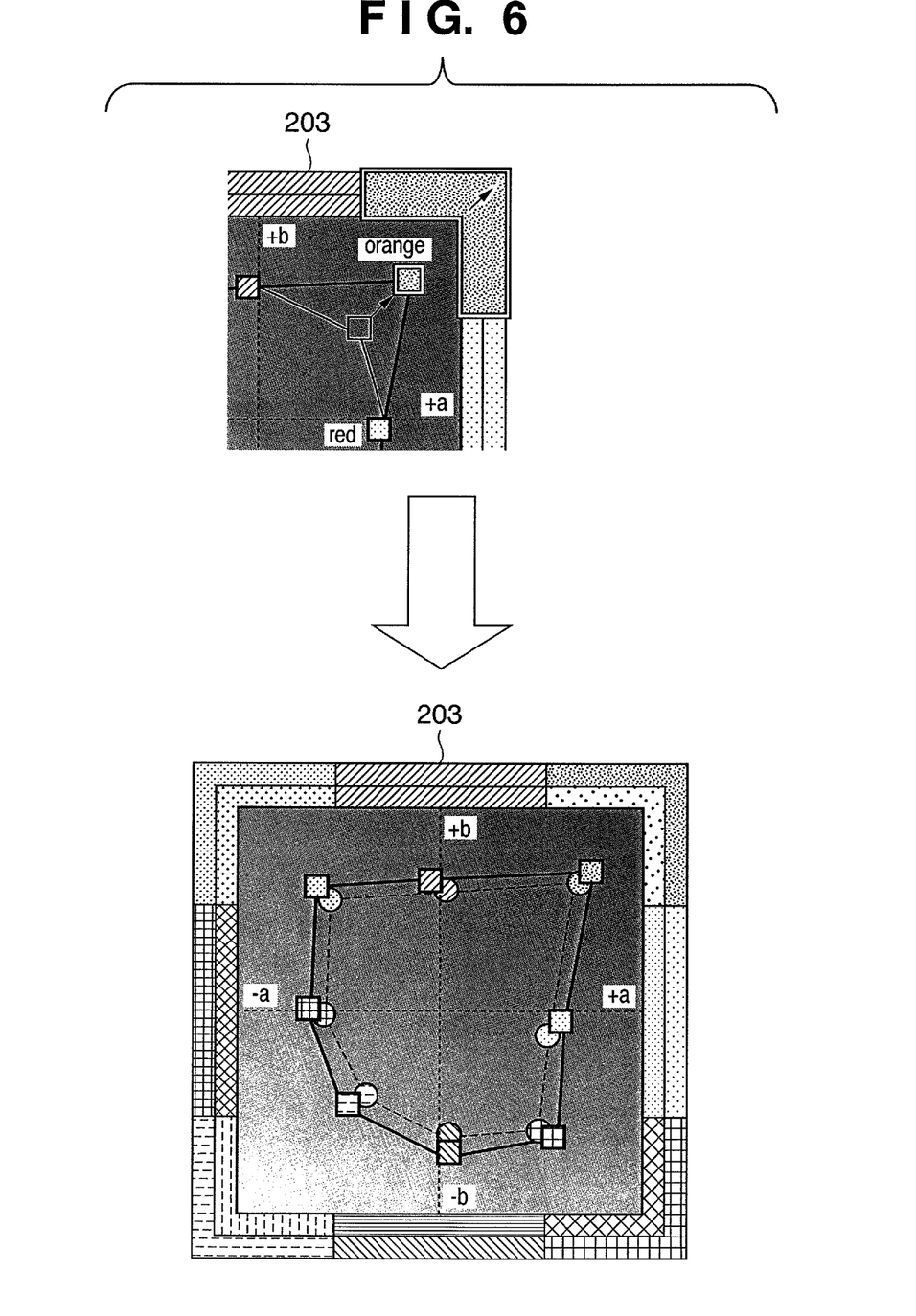
FIG. 6 shows an example of the user interface image when a user performs an edit operation of a target color in the color table editing apparatus according to the embodiment of the present invention.

FIG. 6 shows an example of the display part displayed in the hue/saturation edit operating section 203 in the user interface image 200 when a user performs an edit operation of the target color in the color table editing apparatus 100.

The user can move the target color control point to the coordinate position corresponding to the intended color by dragging the mouse in the operation unit 102 on the target color control point on the ab plane or the color palette along the periphery.

After this moving operation, the position at which the user ended the dragging operation of the mouse in the operation unit 102 is determined as the position of the target color control point. The color data processing unit 104 generates optimized color data for each target color and plots it at the corresponding color coordinate position on the ab plane, like the target color data. At this time, in order to distinguish it from the target color data, the optimized color data are plotted with circles and connected to each other with broken lines.

In addition, the display color of the inside frame of the color palette along the periphery is set to the optimized color of the corresponding target color. Thus, each color data is displayed such that a change from the initial value of the target color to the optimized color can be understood at a glance.

Figure 7:
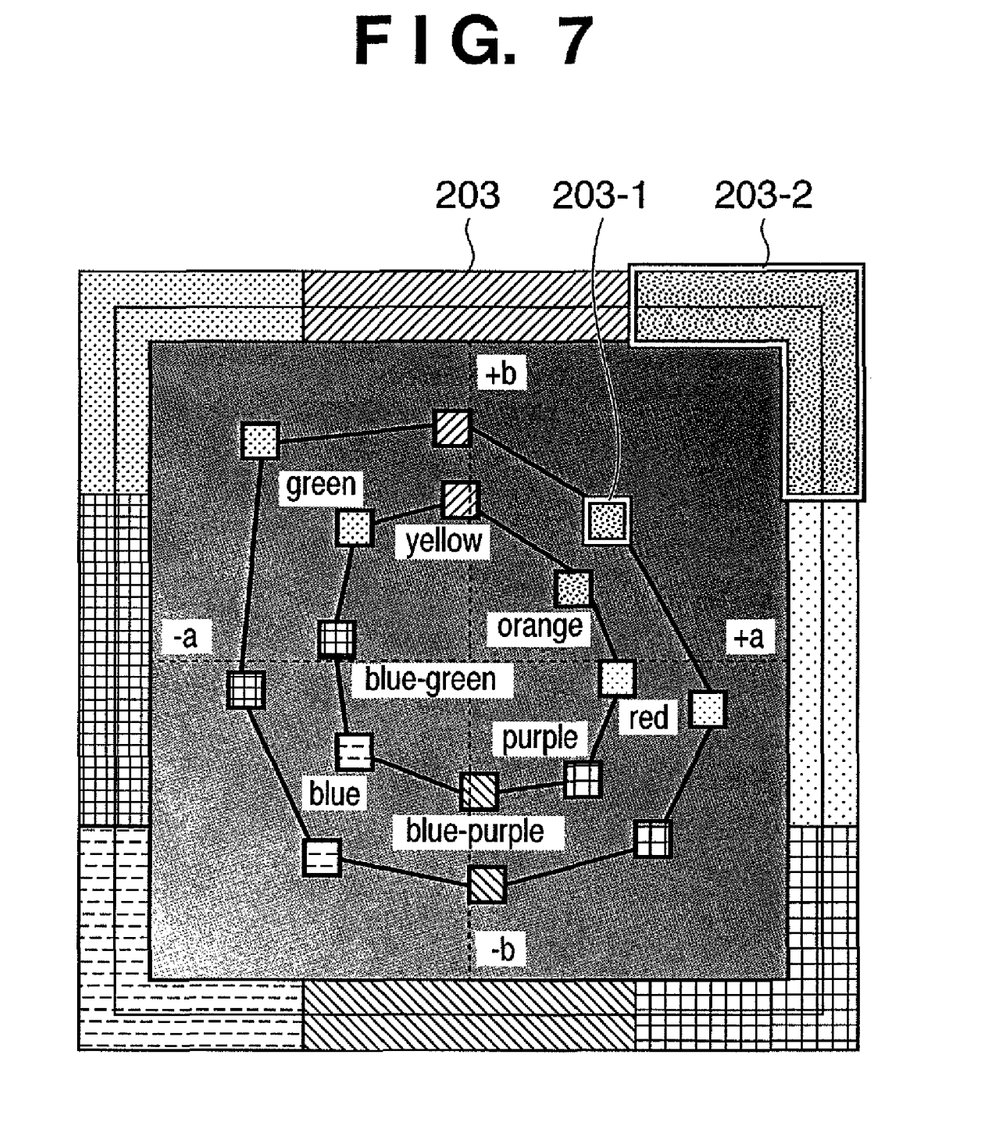
FIG. 7 shows an example of the user interface image when target color data exist for low color saturation and high color saturation in the color table editing apparatus according to the embodiment of the present invention.

FIG. 7 shows an example of a display part displayed in the hue/saturation edit operating section 203 in the user interface image 200 when two types, i.e., low color saturation and high color saturation, of target color data exist in the color table editing apparatus 100.

First, when two types, i.e., low color saturation and high color saturation, of target color data exist, control points for low color saturation and those for high color saturation are respectively displayed to be connected to each other. In this case, since optimized color data also exist for low color saturation and high color saturation, control points of the optimized color data for low color saturation and high color saturation are respectively displayed to be connected to each other. With this arrangement, the optimization state of the overall color data can be grasped for the low color saturation and high color saturation at a glance.

Since it is hard to check when the links for low and high color saturations are simultaneously displayed, the color palette along the periphery may be displayed in correspondence with one of the low and high color saturations. Accordingly, when the target color data selected on the ab plane is for low color saturation, the color palette is displayed with low color saturation. When the target color data selected on the ab plane is for high color saturation, the color palette is displayed with high color saturation. With this arrangement, the target color data and color palette can be synchronized. In the case of FIG. 7, since the focus frame 203-1 is for high color saturation, the color palette including the color palette with the focus frame 203-2 is displayed with high color saturation. Note that, in the above-described embodiment, the ab plane of an $L^*a^*b^*$ color space has been described since the hue circle is visually understandable. However, another XYZ chromaticity diagram or the like can be used.

The object of the present invention can also be achieved by supplying a storage medium storing software program codes for implementing the functions of the above-described embodiments to a system or an apparatus. That is, the object of the present invention can be achieved by causing the computer (or a CPU or an MPU) of the system or the apparatus to read out and execute the program codes stored in the storage medium. In this case, the program codes read out from the storage medium implement the functions of the above-described embodiments by themselves, and the storage medium storing the program codes constitutes the present invention.

As the storage medium for supplying the program codes, for example, a flexible disk, a hard disk, an optical disk, a magnetooptical disk, a CD-ROM, a CD-R, a magnetic tape, a nonvolatile semiconductor memory card, a ROM, or the like can be used. The functions of the above-described embodiments may be implemented by causing the computer to execute the readout program codes.

The functions of the above-described embodiments are also implemented when the OS (Operating System) running on the computer performs part or all of the actual processing based on the instructions of the program codes.

The program codes read out from the storage medium may be written in the memory of a function expansion board inserted into the computer or a function expansion unit linked to the computer. The functions of the above-described embodiments can be implemented when the CPU of the function expansion board or function expansion unit performs part or all of actual processing on the basis of the instructions of the program codes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-045862, filed Feb. 22, 2006, which is hereby incorporated by reference herein in its entirety.

What is claimed is:

1. A color table editing apparatus comprising:
an image data input unit configured to input image data;
a color table selection unit configured to select a specific color table from a plurality of color tables in association with the input image data;
an initial color data generation unit configured to generate initial color data from the selected specific color table and representative color data including a plurality of predetermined colors;
a target color data editing unit configured to edit the initial color data to generate target color data;
an optimized color data generation unit configured to generate optimized color data of the edited target color data by performing optimization processing based on a color gamut of the edited target color data; and
a display unit configured to display, on a hue/saturation plane, graphics indicating, simultaneously, hue and saturation values of the target color data and the optimized color data;
wherein the display unit displays the initial color data and the optimized color data next to each other as color palettes, which are not the graphics displayed on the hue/saturation plane, along a periphery of the hue/saturation plane such that each of the color palettes is displayed at a position corresponding to an initial position of each of the graphics,
wherein the target color data editing unit edits hue and saturation of initial data of the target color data simultaneously by one operation of the graphics displayed on the hue/saturation plane, and edits hue and saturation of initial data of the target color data simultaneously by one operation of the color palettes, and
wherein a processor is configured to function as at least one of the image data input unit, the color table selection unit, the initial color data generation unit, the target color data editing unit, the optimized color data generation unit and the display unit.

2. The apparatus according to claim 1, further comprising:
a custom color table generation unit configured to generate a custom color table for converting the image data from the optimized color data;
a before-edit image data generation unit configured to generate before-edit image data by applying the selected color table to the input image data; and
an after-edit image data generation unit configured to generate after-edit image data by applying the custom color table to the input image data,
wherein the display unit displays the before-edit image data, the after-edit image data, and the graphics corresponding to the image data input unit, the color table selection unit, and the target color data editing unit all together.

3. The apparatus according to claim 1, wherein the color table selection unit is capable of selecting the specific color table from a plurality of color tables prepared in advance.

4. The apparatus according to claim 1, wherein the initial color data generation unit generates the initial color data by gamut mapping, with reference to the selected specific color table, a plurality of representative color data prepared in advance.

5. The apparatus according to claim 1, wherein the optimized color data generation unit generates the optimized color data by using least mean square approximation so as to minimize a difference between a calculated result and the target color data in all operational target colors.

6. The apparatus according to claim 1, wherein the display unit 1-dimensionally displays brightness values of the target color data and brightness values of the optimized color data along the periphery of the hue/saturation plane, and
the target color data editing unit edits the brightness values on the 1-dimensional display.

7. The apparatus according to claim 6, wherein the display unit displays the target color data and the optimized color data on the hue/saturation plane in different manners.

8. The apparatus according to claim 6, wherein the display unit displays the target color data and the optimized color data on the hue/saturation plane by connecting the target color data to each other and connecting the optimized color data to each other.

9. The apparatus according to claim 8, wherein the display unit displays, when the target color data or the optimized color data exist for low color saturation and high color saturation, the graphic which displays the target color data or the optimized color data by connecting the low-saturation data to each other and connecting the high-saturation data to each other.

10. The apparatus according to claim 6, wherein a background of the hue/saturation plane is displayed in a color corresponding to a color space coordinate system with gradation.

11. The apparatus according to claim 1, wherein when the target color data editing unit selects the target color data from the target color data and the color palette displayed on the hue/saturation plane, the display unit focuses on and displays the target color data and the corresponding color palette.

12. The apparatus according to claim 1, wherein when the target color data editing unit selects the color palette from the target color data and the color palette displayed on the hue/saturation plane, the display unit focuses on and displays the color palette and the corresponding target color data.

13. The apparatus according to claim 1, wherein if the target color data exist for low color saturation and high color saturation, when the target color is selected, the displays a display color of the color palette with the same color saturation as the selected target color.

14. The apparatus according to claim 1, wherein if the graphics of the target color data are displayed to overlap each other on the hue/saturation plane, when a color palette along the periphery of the hue/saturation plane is operated, the graphic of the target color data corresponding to the operated color palette is displayed in a foreground on the hue/saturation plane.

15. A color table editing method comprising:
using a processor to perform:
an image data input step adapted to input image data;
a color table selection step adapted to select a specific color table from a plurality of color tables in association with the input image data;
an initial color data generation step adapted to generate initial color data from the selected specific color table and representative color data including a plurality of predetermined colors;
a target color data editing step adapted to edit the initial color data to generate target color data;
an optimized color data generation step adapted to generate optimized color data of the edited target color data by performing optimization processing based on a color gamut of the edited target color data;
a display step adapted to display, on a hue/saturation plane, graphics indicating, simultaneously, hue and saturation values of the target color data and the optimized color data, and
wherein in the display step, the initial color data and the optimized color data are displayed next to each other as color palettes, which are not the graphics displayed on the hue/saturation plane, along a periphery of the hue/saturation plane such that each of the color palettes is displayed at a position corresponding to an initial position of each of the graphics, and
wherein in the target color data editing step, hue and saturation of initial data of the target color data are edited simultaneously by one operation of the graphics displayed on the hue/saturation plane, and hue and saturation of initial data of the target color data are edited simultaneously by one operation of the color palettes.

16. The method according to claim 15, wherein in the display step, the target color data and the optimized color data displayed on the hue/saturation plane are displayed by connecting the target color data to each other and connecting the optimized color data to each other.

17. A computer-executable program stored on a non-transitory computer-readable storage medium, the program for causing a computer to execute a procedure of a color table editing method cited in claim 15.

18. A non-transitory computer readable storage medium storing a program for causing a computer to execute a procedure of a color table editing method cited in claim 15.

* * * * *